May 15, 1928. 1,669,813
W. A. GEIGER
FRICTION SHOCK ABSORBING MECHANISM
Filed July 10, 1924
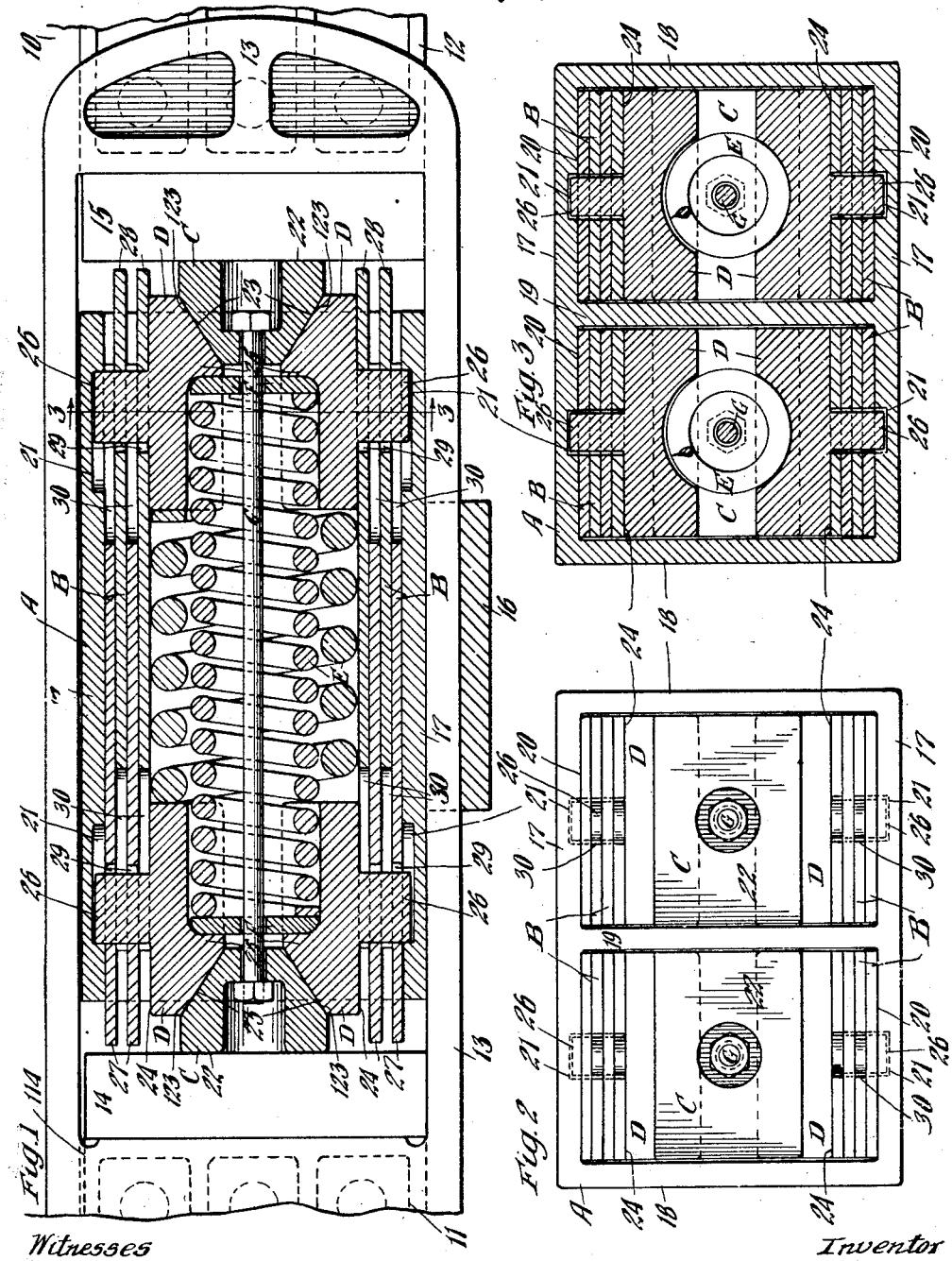
Witnesses
Hans M. Rachlitz
Inventor
William A. Geiger
By George D. Haight
His Atty Patented May 15, 1928.

1,669,813

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 10, 1924. Serial No. 725,111.

This invention relates to friction shock absorbing mechanisms.

One object of the invention is to provide a friction shock absorbing mechanism, of the intercalated friction plate type, especially adapted for railway draft riggings, wherein high capacity is obtained by providing twin arranged friction shells each having cooperating therewith a friction system including a plurality of friction plates and lateral pressure creating means of the double ended type, the arrangement being such as to provide for the maximum number of friction plates and the greatest possible spring diameter consistent with the space available for the draft gear, as prescribed by the Master Car Builders and railroads.

Other objects and advantages of the invention will more clearly and fully appear from the description and claims hereinafter following.

In the drawing, forming a part of this specification, Figure 1 is a part elevational, and part vertical, longitudinal sectional view of a portion of a railway draft rigging, showing my improvements in connection therewith. Figure 2 is a front end, elevational view of the shock absorbing mechanism proper. And Figure 3 is a vertical, transverse sectional view corresponding substantially to the line 3—3 of Figure 1.

In said drawing, 10 denotes one of the usual spaced, draft or center sills of a railway car underframe, to the inner faces of which are secured front stop lugs 11 and rear stop lugs 12. The usual yoke is indicated at 13, the same being operably connected to the drawbar 114. The shock absorbing mechanism proper is operatively supported within the yoke 13 as are also the front and rear followers 14 and 15. The movable parts of the draft rigging are supported by a detachable saddle plate 16.

The improved shock absorbing mechanism, as shown, comprises broadly a casing A, groups of friction plates B—B; two sets of front and rear wedge blocks C—C; two pairs of front and two pairs of rear friction wedge shoes D—D; a pair of main spring resistance elements E; two sets of front and rear spring followers F—F; and a pair of retainer bolts G.

The casing A is in the form of a rectangular box-like casting, open at its opposite ends, and has spaced top and bottom walls 17—17; spaced, vertically disposed, longitudinally extending side walls 18—18 and a central, vertical, longitudinally disposed bracing partition wall 19 extending from end to end of the casing. The partition wall 19 divides the casing into two friction shells and ties the top and bottom walls together, bracing the same against spreading. The top and bottom walls 17 of the casing A present longitudinally disposed, interior friction surfaces 20—20 with which the corresponding groups of friction plates B are adapted to cooperate. In this connection it is pointed out that each shell is provided with a pair of opposed friction surfaces 20 as clearly shown in Figure 3. Adjacent the front and rear ends of the casing A, the top and bottom walls 17—17 are provided with elongated recesses 21—21 forming guideways for a purpose hereinafter described. The shell is provided with four such recesses or guideways, two being associated with each friction shell, the same being equally spaced from the corresponding side wall 18 and the central partition wall 19.

The wedge blocks C are of like construction, two of the same being associated with each friction shell, one block being disposed at the front end and the other at the rear end thereof and cooperating respectively with the front and rear main followers 14 and 15. Each of the wedge blocks C has an outer flat transverse face 22 bearing on the inner surface of the corresponding main follower and a pair of inwardly converging flat faces 23 at the inner end thereof adapted to cooperate with the corresponding pair of wedge friction shoes D.

The wedge friction shoes D are also of like construction each shoe having a flat outer face 24 adapted to cooperate with the innermost plate of the corresponding group of plates B. On the inner side each shoe D has a lateral enlargement 25 provided with a wedge face 123 adapted to cooperate with the corresponding wedge face 23 of one of the wedge blocks C. On the other side, midway between the ends thereof, each shoe D has a laterally projecting lug 26 adapted to cooperate with the friction plates B to restore the same to normal position. The friction plates B are arranged in four groups, two being associated with each friction shell and cooperating respectively with the top and bottom friction surface 20 thereof.

Each group consists of four friction plates, two of the same being indicated by 27 and the remaining two by 28. The friction plates 27 and 28 are all of like construction, each plate having an elongated opening 29 adjacent one end thereof and an inwardly extending slot 30 at the opposite end thereof. The plates 27 of each group have the openings 29 disposed adjacent the front end of the mechanism and said openings are adapted to receive the corresponding lug 26 of one of the front shoes D, the lug being of such a length as to project beyond the outermost plate 27 and extend into the corresponding recess 21 of the casing A, as most clearly shown in Figures 1 and 3. The slots 30 of the plates 28 of the corresponding group also receive said lug 26 and provide clearance for the same to permit full movement of the plates during a compression stroke of the mechanism. The openings 29 at the rear ends of the plates 28 receive the lugs 26 of the corresponding rear friction wedge shoe D and the slots 30 of the plates 27 provide clearance for the longitudinal movement of the plates in a manner similar to that hereinbefore described in connection with the plates 27. The lug 26 of said rear friction wedge shoe D also projects into the corresponding recess at the rear end of shell A. The recesses 30 at the front and rear ends of the casing A, as clearly shown in Figure 1, are of such length as to provide for the necessary realtive movement of the front and rear friction shoes during the compression of the mechanism, and the lugs 26 are adapted to coact with the outer end walls of said recesses to restore the casing A to normal position. It will also be noted that the openings 29 of the respective plates are of such a length as to provide for limited relative movement of the shoes and the plates so that the outer ends of the plates may be engaged by the front and rear followers after a predetermined relative movement of the front and rear pairs of friction wedge shoes to effect relative movement of the plates composing the respective groups.

One of the spring resistance elements E is associated with each friction shell, being interposed between the front and rear pairs of friction shoes thereof. Each spring resistance element E comprises an inner, relatively light coil having its opposite ends bearing on the corresponding front and rear spring followers F, which in turn bear on the inner ends of the corresponding enlargement 25 of the friction shoes D, and a relatively heavier, shorter, outer coil having its opposite ends bearing on the inner ends of the respective pairs of friction wedge shoes. The friction system associated with each shell is held in assembled relation and under initial compression by one of the retainer bolts G, the same having its front and rear ends suitably anchored to the corresponding front and rear wedge blocks C and having the shank thereof extending through the inner coil of the spring resistance G and aligned openings in the front and rear spring followers F.

The operation of my improved shock absorbing mechanism is as follows, assuming a compression stroke of the mechanism. The followers 14 and 15 will be moved relatively toward each other, carrying therewith the front and rear sets of wedge blocks C, which in turn force the corresponding pairs of friction wedge shoes apart, placing the various groups of friction plates under lateral pressure. As the front and rear followers approach each other, the friction shoes D at the front and rear ends of the mechanism will be moved relatively inwardly of the mechanism, slipping on the friction surfaces of the innermost plates 28 of the groups B. During this time, the lugs 26 of the front and rear shoes will be moved out of engagement with the outer ends of the openings 29 of the corresponding plates B and also moved away from the outer end walls of the recesses 20 of the casing A. This action will continue until the front and rear followers come into abutment with the front ends of the plates 27 and the rear ends of the plates 28 and upon further relative movement of the front and rear followers, the plates 27 and 28 will be moved relatively to each other, greatly augmenting the resistance offered, due to the friction existing between the various plates.

When the mechanism is fully compressed, relative movement of the front and rear followers is arrested by engagement with the opposite ends of the casing A, the casing acting as a column to transmit the load and prevent the springs from being driven solid. In this connection it is pointed out that the partition wall 19 which extends from end to ends of the casing forms an additional bracing element for the casing functioning as an added column or post member to transmit the force directly from one follower to the other.

Upon reduction of the actuating force, the initial action will be a release of the front and rear wedges C and an outward movement of the respective pairs of friction shoes D, the same being free to move outwardly independently of the friction plates due to the lugs 26 being spaced from the outer end walls of the openings 29 of the various plates. The lateral pressure on the plates will thus be instantly reduced, effecting an easy release of the mechanism. As the front and rear pairs of shoes are carried outwardly by the expansion of the spring resistance elements E, the lugs 26 thereof will pick up the plates 27 and 28 and carry the same outwardly and restore them to normal position.

Outward movement of the front and rear pairs of friction shoes will be arrested by the lugs thereof coming into engagement with the outer end walls of the corresponding front and rear recesses 21 of the casing A.

I have herein shown and described what I now consider the preferred manner of carrying out the invention, but the same is merely illustrative, and I contemplate all changes and modifications that come within the scope of the claims appended hereto.

I claim:

1. In a friction shock absorbing mechanism, the combination with front and rear followers relatively movable toward and away from each other; of a plurality of relatively movable friction plates, said plates being divided into a plurality of groups, said groups being arranged in sets at opposite sides of the mechanism; of spreading means interposed between each set of said groups, said spreading means being disposed at opposite ends of said plates; a casing interposed between said followers, said casing being divided into twin friction shells by a longitudinally disposed bracing partition wall, said casing being engaged by said followers upon full compression of the mechanism, each shell cooperating with a set of said groups of plates, and spring resistance means cooperating with said spreading means.

2. In a friction shock absorbing mechanism, the combination with front and rear follower acting means; of a casing interposed between said followers, said casing having top, bottom and side walls, and a longitudinally disposed central bracing wall extending from end to end of the casing, said casing being engaged by said followers upon full compression of the mechanism and forming a column load transmitting element, said central wall dividing the casing into twin friction shells, a plurality of longitudinally disposed, relatively movable friction plates divided into two sets, each composed of two groups, one of said sets being disposed in each shell, twin arranged spreading means, each of said twin spreading means cooperating with one of said sets of plates; and a spring resistance cooperating with each spreading means.

3. In a friction shock absorbing mechanisms, the combination with front and rear relatively movable follower acting members; of a casing interposed between said follower members, said casing being divided into twin friction shells by a longitudinally disposed bracing partition wall, said casing being engaged by and limiting relative approach of said followers upon full compression of the mechanism and providing a solid column to transmit the load; a friction system cooperating with each shell, said system including front and rear sets of friction wedge shoes and cooperating wedge pressure transmitting members; and a spring resistance cooperating with each friction system.

4. In a friction shock absorbing mechanism, the combination with front and rear follower acting members; of a casing interposed between said follower members, said casing having a longitudinally disposed, partition column element dividing the same into twin friction shells and extending from end to end of the casing, each shell having interior friction surfaces at the opposite sides thereof; twin arranged friction system co-operating with said shells, each system including a plurality of relatively movable friction plates, front and rear wedge spreading means and a main spring resistance.

5. In a friction shock absorbing mechanism, the combination with front and rear follower acting members; of a casing interposed between said followers, said casing having a longitudinally disposed partition wall forming a column element extending from end to end of the casing and dividing the same into twin friction shells; twin arranged friction systems co-operating with said shells; each of said systems including front and rear pairs of wedge shoes, co-operating front and rear wedges, and a main spring resistance.

6. In a friction shock absorbing mechanism, the combination with front and rear follower acting members; of a casing interposed between said follower members, said casing having longitudinally disposed, spaced side walls, longitudinally disposed top and bottom walls and a longitudinally disposed central partition wall extending from end to end of the casing and formed integral with said top and bottom walls, said partition dividing said casing into twin friction shell sections, each having opposed interior friction surfaces; a plurality of longitudinally disposed friction plates co-operating with said shell friction surfaces, said plates being divided into twin pairs of groups; spreading means interposed between each pair of groups, said spreading means comprising a wedge and a pair of co-operating friction shoes at each end of the mechanism; and a spring resistance co-operating with each spreading means.

In witness that I claim the foregoing I have hereunto subscribed my name this 1st day of July, 1924.

WILLIAM A. GEIGER.